US012053061B2

(12) United States Patent
Safe

(10) Patent No.: US 12,053,061 B2
(45) Date of Patent: Aug. 6, 2024

(54) BUCKLE ASSEMBLY AND HARNESS COMPRISING THE SAME

(71) Applicant: 3M INNOVATIVE PROPERTIES COMPANY, St. Paul, MN (US)

(72) Inventor: Nathan W. Safe, Red Wing, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

(21) Appl. No.: 18/000,755

(22) PCT Filed: Jun. 1, 2021

(86) PCT No.: PCT/IB2021/054803
§ 371 (c)(1),
(2) Date: Dec. 5, 2022

(87) PCT Pub. No.: WO2021/260462
PCT Pub. Date: Dec. 30, 2021

(65) Prior Publication Data

US 2023/0255325 A1 Aug. 17, 2023

Related U.S. Application Data

(60) Provisional application No. 63/043,344, filed on Jun. 24, 2020.

(51) Int. Cl.

| | |
|---|---|
| ***A44B 11/25*** | (2006.01) |
| ***A44B 11/26*** | (2006.01) |
| ***A62B 35/00*** | (2006.01) |

(52) U.S. Cl.
CPC ........ *A44B 11/2592* (2013.01); *A44B 11/266* (2013.01); *A62B 35/0025* (2013.01)

(58) Field of Classification Search
CPC .............. A44B 11/2592; A44B 11/266; A44B 11/006; A62B 35/0025
See application file for complete search history.

(56) References Cited

U.S. PATENT DOCUMENTS

| | | | |
|---|---|---|---|
| 5,084,946 | A | 2/1992 | Lee |
| 5,293,673 | A | 3/1994 | Murai |

(Continued)

FOREIGN PATENT DOCUMENTS

| | | | |
|---|---|---|---|
| EP | 0646336 | A1 | 4/1995 |
| EP | 2191739 | A2 | 6/2010 |

(Continued)

OTHER PUBLICATIONS

"COBRA® Quick Releases", 2020, p. 1.

(Continued)

*Primary Examiner* — Robert Sandy
(74) *Attorney, Agent, or Firm* — Kenneth B. Wood

(57) ABSTRACT

A buckle assembly and a harness including the buckle assembly. The buckle assembly includes a male buckle and a female buckle removably coupled to the male buckle. The male buckle includes a catch and a first adjustment member extending from the catch. The first adjustment member defines a plurality of first slots therethrough, such that each first slot is configured to movably receive a first webbing therethrough. The female buckle includes a main body and a second adjustment member extending from the main body. The main body is configured to at least partially receive the catch therein. The second adjustment member defines a plurality of second slots therethrough, such that each second slot is configured to movably receive a second webbing therethrough.

21 Claims, 12 Drawing Sheets

(56) References Cited

U.S. PATENT DOCUMENTS

| | | | | | |
|---|---|---|---|---|---|
| 5,380,067 | A * | 1/1995 | Turvill | A44B 11/266 | 24/615 |
| 5,584,105 | A * | 12/1996 | Krauss | A44B 11/266 | 24/615 |
| 5,839,793 | A * | 11/1998 | Merrick | A44B 11/006 | 24/615 |
| 6,665,915 | B1 * | 12/2003 | Higuchi | A44B 11/266 | 24/615 |
| 6,728,999 | B2 * | 5/2004 | Murai | A44B 11/266 | 24/615 |
| 7,331,088 | B2 * | 2/2008 | Pontaoe | A44B 11/266 | 24/625 |
| D621,743 | S | 8/2010 | Hortnagl | | |
| D621,744 | S | 8/2010 | Hortnagl | | |
| D738,255 | S | 9/2015 | Hortnagl | | |
| 9,993,048 | B2 | 6/2018 | Casebolt | | |
| 2010/0071173 | A1 | 3/2010 | Hortnagl | | |
| 2010/0122437 | A1 | 5/2010 | Hortnagl | | |
| 2013/0192033 | A1 | 8/2013 | Hortnagl | | |
| 2013/0291344 | A1 | 11/2013 | Hortnagl | | |
| 2014/0082902 | A1 | 3/2014 | Hortnagl | | |
| 2014/0215773 | A1 | 8/2014 | Hortnagl | | |
| 2014/0298630 | A1 | 10/2014 | Hortnagl | | |
| 2014/0304955 | A1 | 10/2014 | Hortnagl | | |
| 2014/0325804 | A1 | 11/2014 | Hortnagl | | |
| 2015/0067989 | A1 | 3/2015 | Hortnagl | | |
| 2018/0289113 | A1 * | 10/2018 | Chu | A44B 11/266 | |
| 2019/0313746 | A1 | 10/2019 | Hetrich | | |
| 2019/0380453 | A1 | 12/2019 | Hortnagl | | |
| 2020/0008537 | A1 | 1/2020 | Sepe et al. | | |

FOREIGN PATENT DOCUMENTS

| | | | |
|---|---|---|---|
| EP | 3581057 | A1 | 12/2019 |
| JP | 05329009 | A | 12/1993 |
| WO | 2019200050 | A1 | 10/2019 |
| WO | 2020014114 | A1 | 1/2020 |

OTHER PUBLICATIONS

"MSA Harness", 2020, p. 1.
International Search Report for PCT International Application No. PCT/IB2021/054803, mailed on Sep. 7, 2021, 4 pages.

* cited by examiner

BUCKLE ASSEMBLY AND HARNESS COMPRISING THE SAME

TECHNICAL FIELD

The present disclosure relates generally to a buckle assembly, and in particular, to a buckle assembly for a wearable body harness.

BACKGROUND

Various occupations place people in insecure positions at relatively dangerous heights thereby creating a need for fall protection assemblies. Among other components, such assemblies usually include at least one wearable body harness system interconnected between a support structure and a person working in proximity to the support structure. The wearable body harness system includes a connecting element, which typically connects the harness system to the support structure or an anchor point.

Buckles are widely used in such harnesses for coupling two straps or webbings together. A wearable harness may also require multiple adjustment points to ensure a proper fit for users of different sizes and proportions. Such adjustment points may enable adjustment of the straps or webbings. Conventional buckles and adjustment mechanisms have a complicated design and may not provide desired comfort to users.

SUMMARY

In a first aspect, the present disclosure provides a buckle assembly. The buckle assembly includes a male buckle and a female buckle. The male buckle includes a catch and a first adjustment member extending from the catch. The first adjustment member defines a plurality of first slots therethrough, such that each first slot is configured to movably receive a first webbing therethrough. The female buckle is removably coupled to the male buckle. The female buckle includes a main body and a second adjustment member extending from the main body. The main body is configured to at least partially receive the catch therein. The second adjustment member defines a plurality of second slots therethrough, such that each second slot is configured to movably receive a second webbing therethrough.

In a second aspect, the present disclosure provides a wearable body harness. The wearable body harness includes a first webbing, a second webbing and a buckle assembly. The buckle assembly includes a male buckle and a female buckle. The male buckle includes a catch and a first adjustment member extending from the catch. The first adjustment member defines a plurality of first slots therethrough, such that each first slot is configured to movably receive a first webbing therethrough. The female buckle is removably coupled to the male buckle. The female buckle includes a main body and a second adjustment member extending from the main body. The main body is configured to at least partially receive the catch therein. The second adjustment member defines a plurality of second slots therethrough, such that each second slot is configured to movably receive a second webbing therethrough.

In a third aspect, the present disclosure provides a buckle assembly. The buckle assembly includes a male buckle and a female buckle. The male buckle includes a catch and a first adjustment member extending from the catch. The first adjustment member defines a plurality of first slots therethrough, such that each first slot is configured to movably receive a first webbing therethrough. The female buckle is removably coupled to the male buckle. The female buckle includes a main body, an elongate member and a second adjustment member. The main body includes a first portion and a second portion. The first portion defines a first end proximal to the male buckle. The first portion is configured to at least partially receive the catch therein. The second portion defines a second end distal to the male buckle. The elongate member is received through the second portion and disposed between the first end and the second end. The elongate member defines an elongate axis along its length. The second adjustment member defines a plurality of second slots therethrough, such that each second slot is configured to movably receive a second webbing therethrough. The second adjustment member is rotatably coupled to the elongate member, such that the second adjustment member is rotatable relative to the main body and about the elongate axis.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1A:
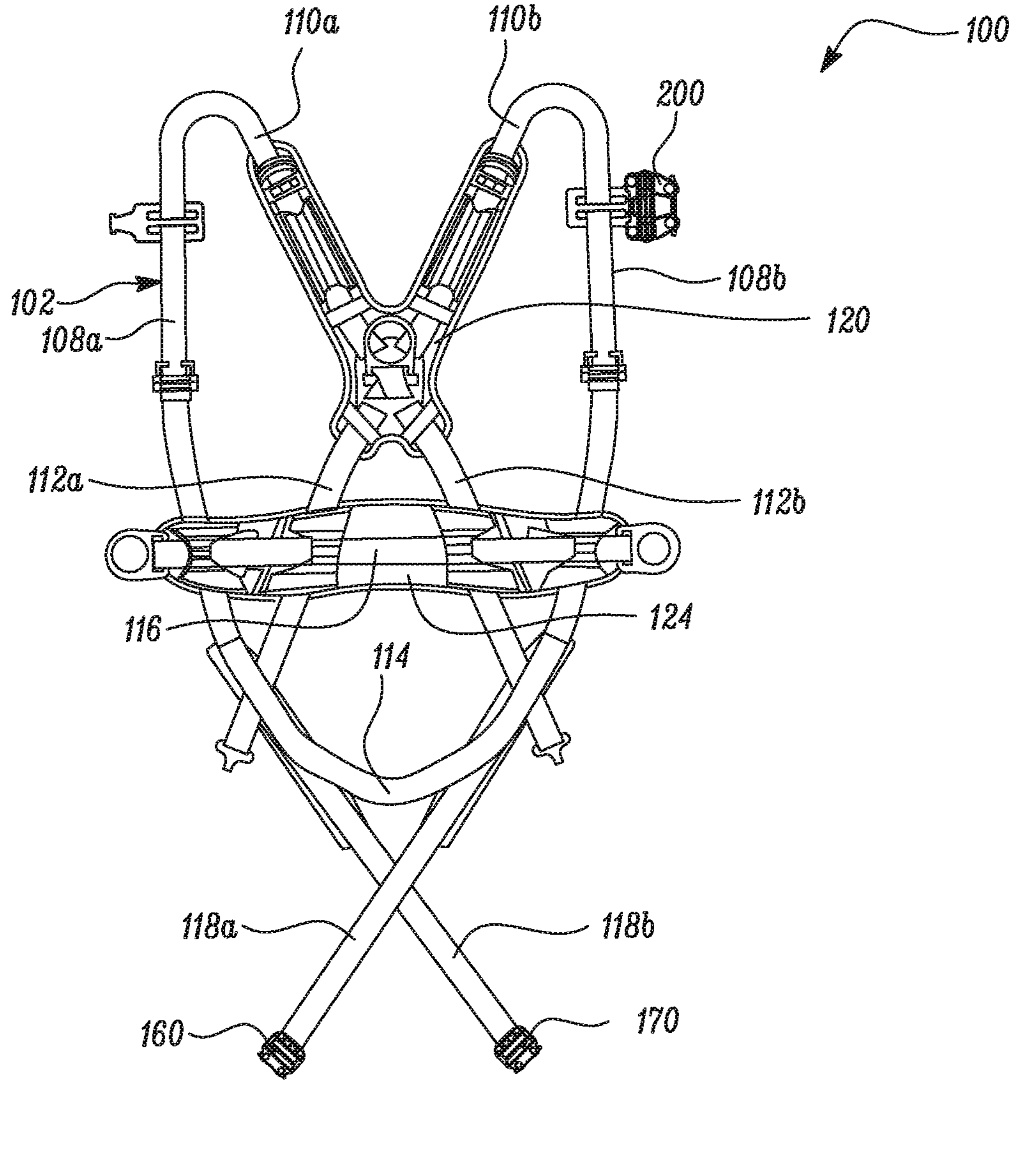
FIG. 1A is a schematic rear view of a harness in accordance with an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a wearable body harness having a buckle assembly. The proposed wearable body harness may be used in securing, lifting and/or lowering individuals in dangerous situations, such as elevated locations. Further, the wearable body harness can be used in a personal fall arrest system. The proposed wearable body harness may also be used for work positioning, travel restriction, ladder climbing, rescue/retrieval, and evacuation.

Conventional wearable body harness systems include a chest attachment assembly having a D-ring, one or more chest buckles and chest webbings. In conventional body harness systems, the chest buckles and chest webbings are arranged and connected such that an overall geometry of the chest attachment assembly may be uncomfortable to users. Further, female users are generally unsatisfied with the current configuration of the chest attachment assembly. Further, an orientation of the conventional chest attachment assembly may generate a sense of insecurity to a user in terms of safety and prevention. There is a further need for improved buckles that can be easily and effectively connected and disconnected to allow quick donning and removal of the harness. There is also a need for improved chest attachment assembly with increased safety compliance and redundant safety mechanisms.

The buckle assembly of the present disclosure includes a male buckle and a female buckle. The male buckle includes a catch and a first adjustment member extending from the catch. The first adjustment member defines a plurality of first slots therethrough. The female buckle is removably coupled to the male buckle. The female buckle includes a main body and a second adjustment member extending from the main body. The second adjustment member defines a plurality of second slots therethrough. Each second slot is configured to movably receive a second webbing therethrough. The removable coupling between the male buckle and the female buckle may allow quick donning and removal of the harness. The buckle assembly may further allow the first webbing and/or the second webbing to be easily adjusted.

Due to inclusion of plurality of first slots in the first adjustment member to movably receive the first webbing, and the inclusion of plurality of second slots in the second adjustment member to movably receive the second webbing, the buckle assembly of the present disclosure may cause the wearable body harness to assume a substantially X-shape upon securing the wearable body harness to a user. The X-shaped configuration of the harness may improve comfort and a sense of security for a user.

Various designs and geometries of the first adjustment member and the second adjustment member may allow a user to secure and adjust shoulder webbings on a torso as per requirements. Different shapes and angles of the first and second slots may receive various shapes of the first and second webbings, respectively. For example, a curved slot may facilitate utilization of a curved webbing. Thus, the disclosed buckle assembly may cater to a variety of applications and users. The X-shaped configuration of the harness in the chest area may further improve comfort and safety for female users.

Figure 1B:
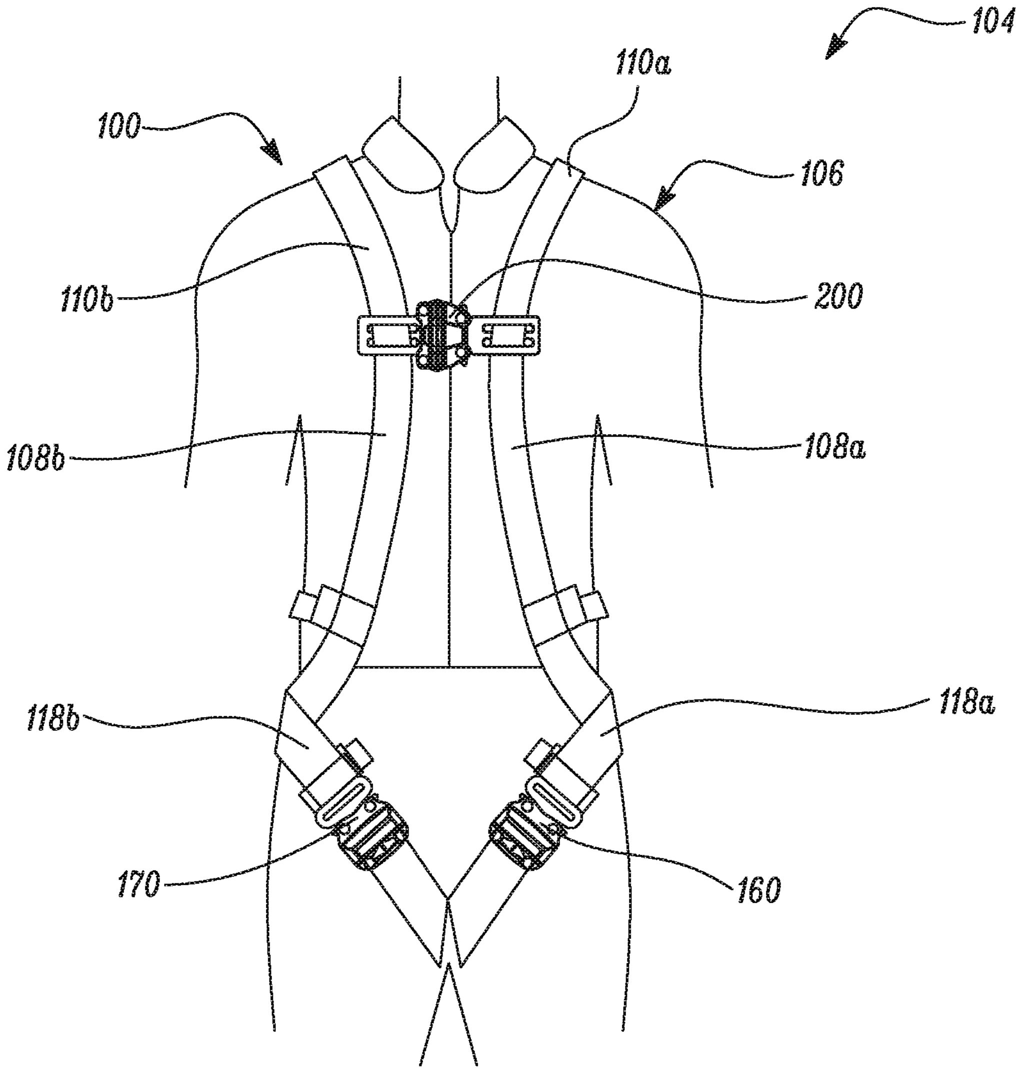
FIG. 1B is a schematic front view of the harness of FIG. 1A worn by a user.

Referring now to the Figures, FIGS. 1A-1B illustrate a wearable body harness 100 in accordance with an embodiment of the present disclosure. The wearable body harness 100 may be used in a fall protection system. The wearable body harness 100 may be interchangeably herein referred to as “the harness 100”. As discussed herein, the wearable body harness 100 has a harness connection arrangement configured for releasably coupling at least a pair of webbings of the wearable body harness 100. Specifically, the wearable body harness 100 has a harness connection arrangement for connecting at least two webbings of the harness 100, such that the harness connection arrangement can be easily and effectively connected and disconnected to allow quick donning and removal of the harness 100.

With continued reference to FIGS. 1A-1B, the harness 100 is illustrated. The harness 100 may be worn by a user 104. The harness 100 includes a webbing 102 configured to engage portions of a user's body 106. The harness 100 further includes a plurality of buckle assemblies 200, 160 and 170.

The webbing 102 includes a plurality of webbings that are secured around the user 104. In particular, the webbing 102 includes shoulder webbings **110*a* and 110*b*, front webbings 108*a* and 108*b*, back webbings 112*a* and 112*b*, a seat webbing 114, a hip webbing 116 and leg webbings 118*a* and 118*b*. A back pad 120 is also provided. The hip webbing 116 may retain a hip pad 124 around a user's hip. Further, the back and hip pads 120, 124 may increase the user's comfort while wearing the harness 100**.

Further, the leg webbings **118*a*, 118*b* are configured to attach around the user's legs. When attached, the leg webbings 118*a*, 118*b* loop around or encircle each of the user's legs. Each leg webbing 118*a*, 118*b* may be formed from a substantially flat webbing material typically used in harness construction. Each leg webbing 118*a*, 118*b* is connected to the seat webbing 114. Accordingly, the position of the leg webbings 118*a*, 118*b* may be adjusted relative to the seat webbing 114 to increase the user's comfort while wearing the harness 100**.

The shoulder webbings **110*a*, 110*b* may be herein interchangeably referred to as first and second webbings 110*a*, 110*b* respectively, without any limitations. The first and second webbings 110*a*, 110*b* are arranged to overlap one another in an X-shaped configuration, with the first and second webbings 110*a*, 110*b* configured to be connected together at the user's chest area. As described herein, the first and second webbings 110*a*, 110*b* may be releasably connected together by the buckle assembly 200**.

Figure 2A:
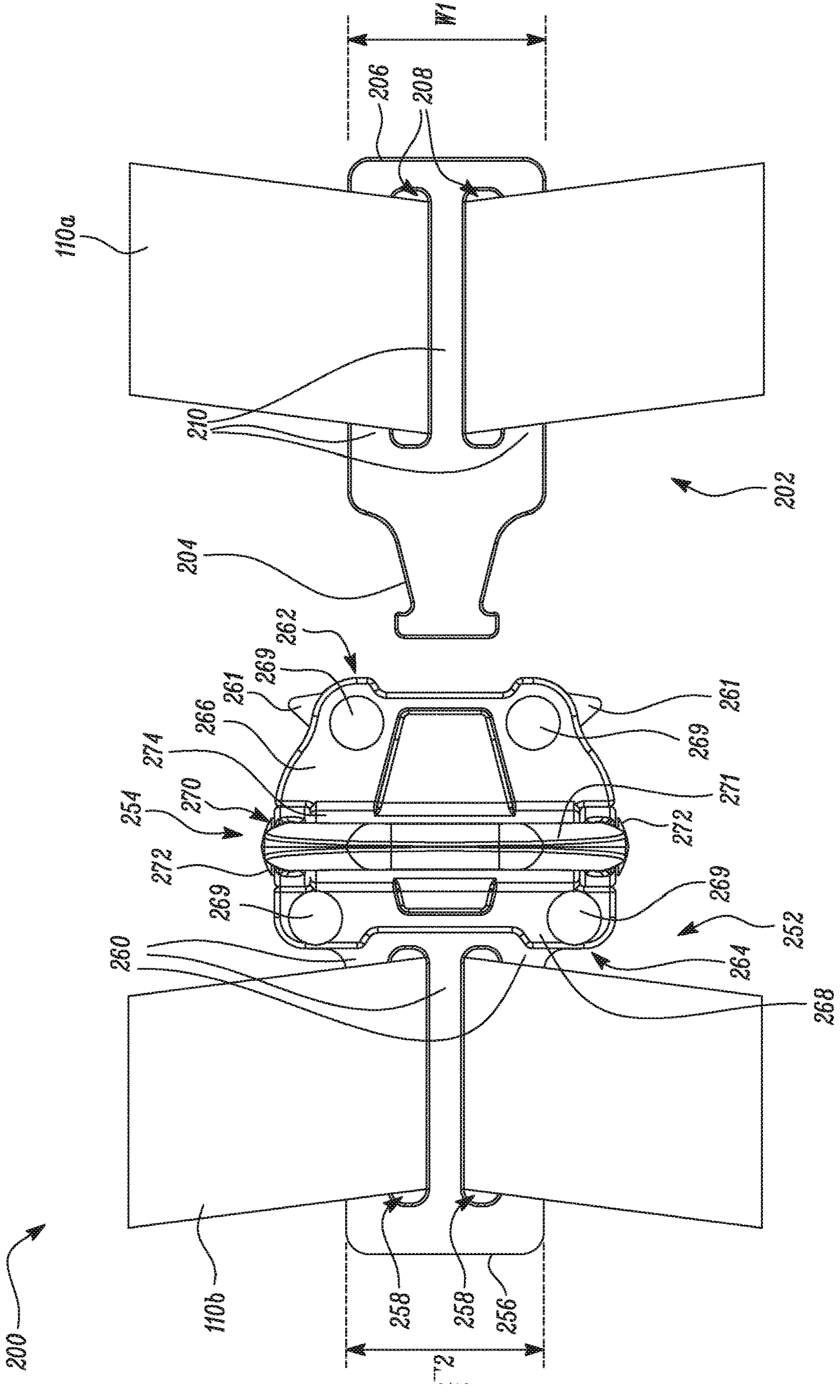
FIG. 2A is a top view of a buckle assembly of the harness of FIGS. 1A-1B, showing a male buckle and a female buckle disconnected from each other, in accordance with an embodiment of the present disclosure.
Figure 2B:
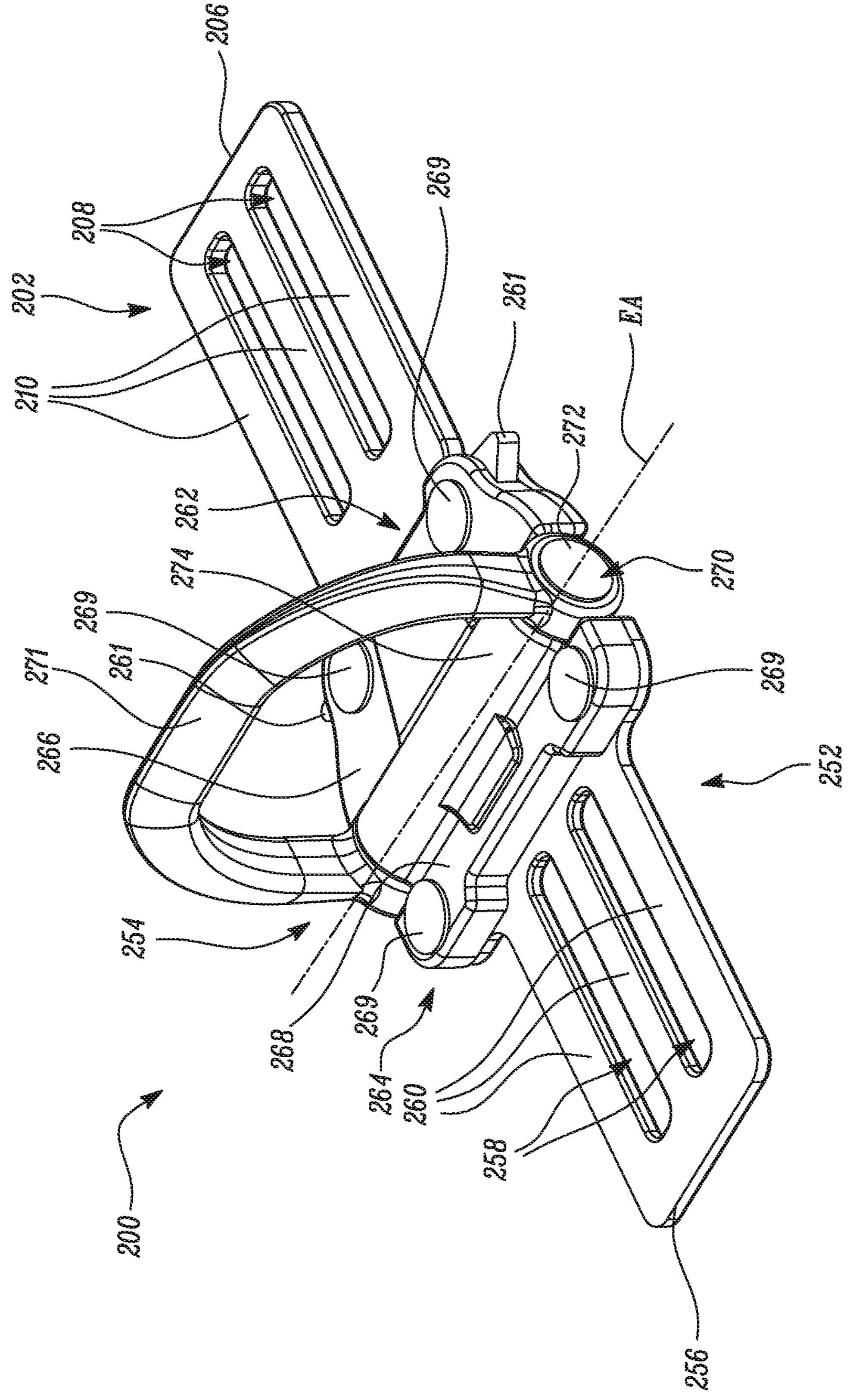
FIG. 2B is a front perspective view of the buckle assembly of FIG. 2A, showing the male buckle and the female buckle connected to each other.

Referring to FIGS. 2A-2B, the buckle assembly 200 is illustrated in accordance with an embodiment of the present disclosure. The buckle assembly 200 includes a male buckle 202 and a female buckle 252. The male buckle 202 includes a catch 204 and a first adjustment member 206 extending from the catch 204. The first adjustment member 206 defines a plurality of first slots 208 therethrough. Each first slot 208 is configured to movably receive the first webbing **110*a* therethrough. In some embodiments, the male buckle 202** may be a single integral part.

In the illustrated embodiment of FIGS. 2A-2B, the first adjustment member 206 includes three first bars 210 joined to each other for defining a pair of the first slots 208. In some other embodiments, the first adjustment member 206 may include four (not shown) first bars 210 joined to each other for defining three (not shown) first slots 208. In the illustrated embodiment, the first slots 208 are substantially parallel to each other. In some embodiments, each first slot 208 has a substantially oblong shape. Further, the first adjustment member 206 has a substantially uniform width "W1" along its length. However, in alternative embodiments, the first adjustment member 206 may have a non-uniform width.

The female buckle 252 includes a main body 254 and a second adjustment member 256. The female buckle 252 is removably coupled to the male buckle 202. The main body 254 is configured to at least partially receive the catch 204 therein. The second adjustment member 256 defines a plurality of second slots 258 therethrough. Each second slot 258 is configured to movably receive the second webbing 110*b* therethrough. In some embodiments, the female buckle 252 may be a single integral part. In some embodiments, the male buckle 202 and the female buckle 252 may be made from metal, plastic, a composite material, or any combination thereof.

In the illustrated embodiment of FIGS. 2A-2B, the second adjustment member 256 includes three second bars 260 joined to each other for defining a pair of the second slots 258. In some other embodiments, the second adjustment member 256 may include four (not shown) second bars 260 joined to each other for defining three (not shown) second slots 258. In some embodiments, the second slots 258 are substantially parallel to each other. In some embodiments, each second slot 258 has a substantially oblong shape. Further, the second adjustment member 256 has a substantially uniform width "W2" along its length. However, in alternative embodiments, the second adjustment member 256 may have a non-uniform width. In the illustrated embodiment, the second adjustment member 256 is a single integral part.

The female buckle 252 further includes a pair of pawls 261 rotationally coupled to the main body 254. The pawls 261 are configured to removably receive the catch 204 therebetween. In an example, the pawls 261 are biased with a pair of biasing members (not shown) to retain the catch 204 within the main body 254 when connected. To release the catch 204 of the male buckle 202 from the main body 254 of the female buckle 252, a user may simultaneously depress the pawls 261 to counter the biasing force provided by the pair of biasing members. Once the pawls 261 are simultaneously depressed, the catch 204 of the male buckle 202 can be removed from the main body 254 of the female buckle 252.

With continued reference to FIGS. 2A-2B, the main body 254 of the female buckle 252 includes a first portion 266, a second portion 268 and an elongate member 270. The first portion 266 defines a first end 262 proximal to the male buckle 202. The first portion 266 is configured to at least partially receive the catch 204 therein, when the male buckle 202 is removably coupled to the female buckle 252. The second portion 268 defines a second end 264 distal to the male buckle 202. The second end 264 may be opposite to the first end 262. The second portion 268 is removably or fixedly coupled to the second adjustment member 256. In the illustrated embodiment, the second adjustment member 256 is fixedly coupled to the main body 254 by one or more fasteners 269. The fasteners 269 may be rivets, pins or screws. The elongate member 270 is received through the second portion 268 and disposed between the first end 262 and the second end 264. The elongate member 270 defines an elongate axis "EA" along its length. The elongate member 270 defines two opposing ends 272 extending outwardly from the second portion 268. In some embodiments, the elongate member 270 may be a rivet or a pin.

Further, the second portion 268 of the main body 254 includes a cylindrical section 274 disposed between the first end 262 and the second end 264. The cylindrical section 274 is configured to receive the elongate member 270 therethrough. The cylindrical section 274 may be hollow for receiving the elongate member 270 therethrough. The buckle assembly 200 further includes a D-ring 271 rotatably coupled to the elongate member 270. Hence, the D-ring 271 is rotatable relative to the main body 254 and about the elongate axis "EA". In the harness 100 of FIGS. 1A-1B, the D-ring 271 is used to couple the harness 100 to a support structure via a lanyard or lifeline. The D-ring 271 is connected to the opposing ends 272 of the elongate member 270. The elongate member 270 may have a tubular portion (not shown) with the opposing ends 272 being widened for retaining the D-ring 271. In some embodiments, the D-ring 271 is rotatable relative to the elongate member 270 about the elongate axis "EA". In some other embodiments, the elongate member 270 may be rotatable relative to the main body 254 and the D-ring 271 may rotate along with the elongate member 270.

The second adjustment member 256 may extend to the first end 262, such that the catch 204 is at least partially received between the main body 254 and the second adjustment member 256. The second adjustment member 256 may be further fixedly coupled to the main body 254 by four fasteners 269. The pawls 261 may be rotationally coupled to respective fasteners 269 near the first end 262.

Figure 3A:
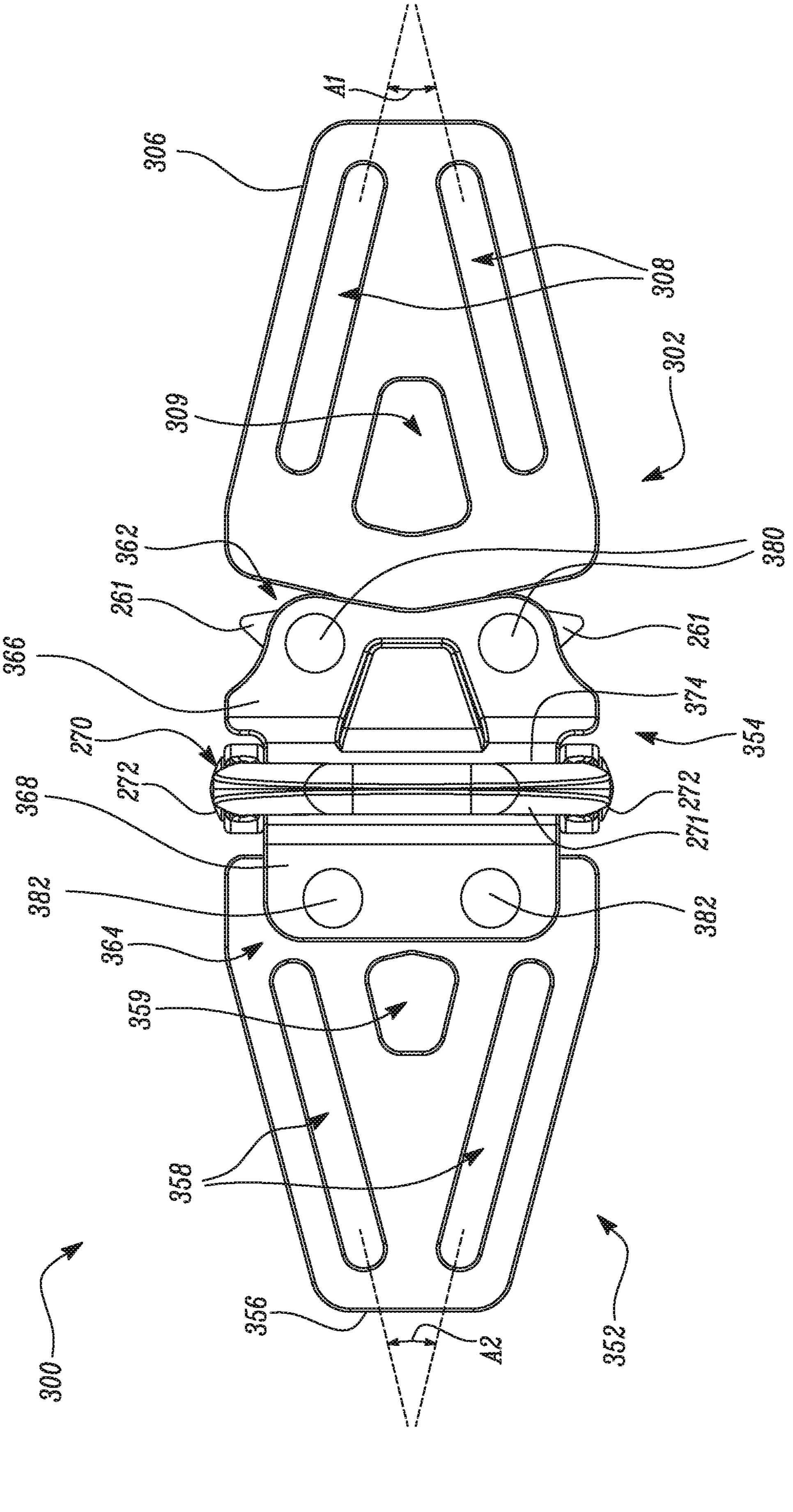
FIG. 3A is a top view of a buckle assembly of the harness of FIGS. 1A-1B, in accordance with an embodiment of the present disclosure.
Figure 3B:
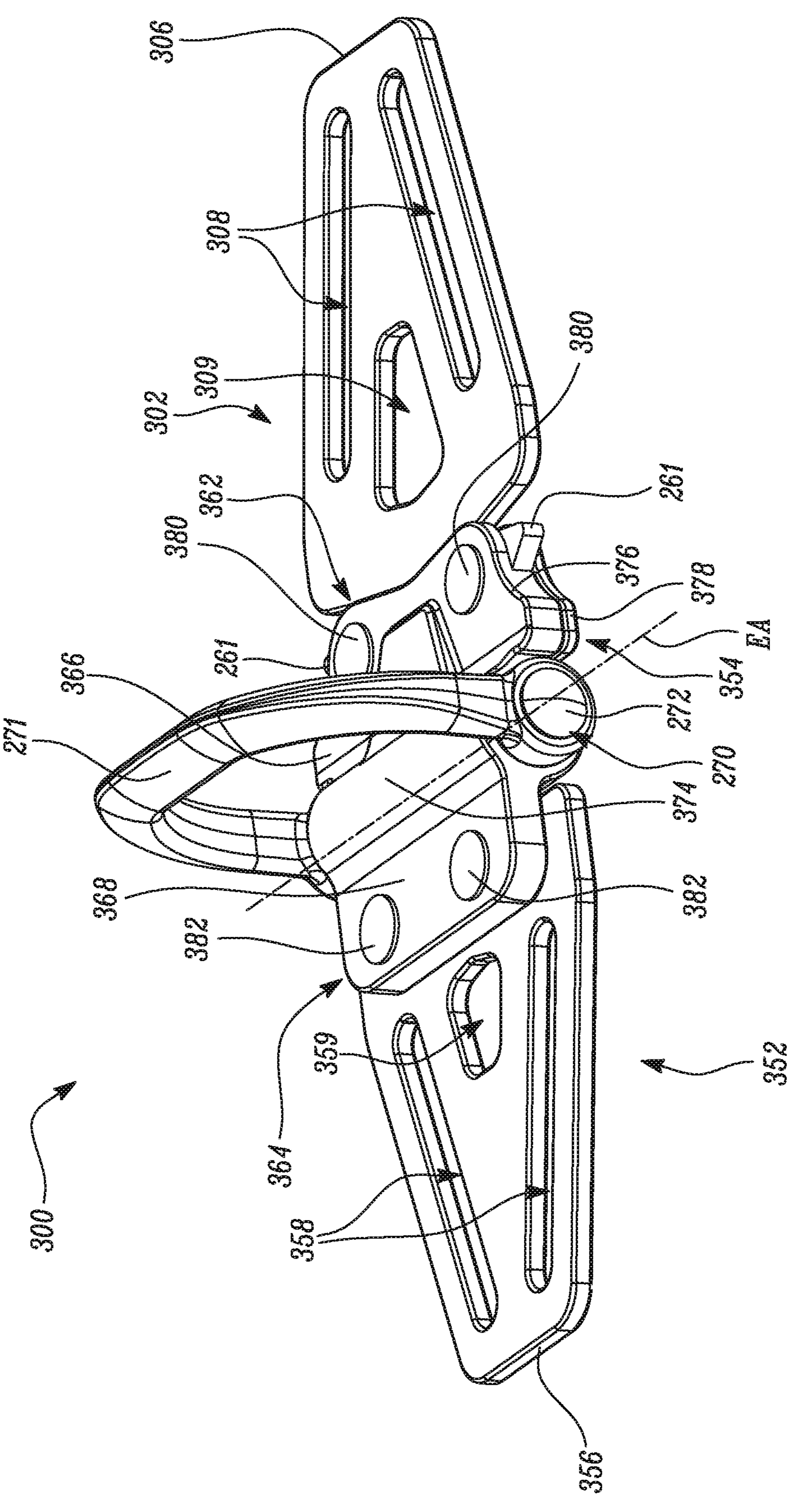
FIG. 3B is a front perspective view of the buckle assembly of FIG. 3A.

FIGS. 3A-3B illustrate a buckle assembly 300 in accordance with an embodiment of the present disclosure. The buckle assembly 300 includes a male buckle 302 and a female buckle 352. The male buckle 302 includes a catch (not shown) and a first adjustment member 306 extending from the catch. The catch of the buckle assembly 300 may be substantially similar in geometry to the catch 204 shown in FIG. 2A. The first adjustment member 306 defines a plurality of first slots 308 therethrough. Each first slot 308 is configured to movably receive the first webbing 110*a* (shown in FIGS. 1A-1B) therethrough. In some embodiments, the male buckle 302 may be a single integral part.

In the embodiment illustrated in FIGS. 3A-3B, the first adjustment member 306 further defines a first intermediate opening 309 extending therethrough and disposed at least partially between the pair of the first slots 308. The first intermediate opening 309 is tapered. Specifically, the first intermediate opening 309 is tapered in a direction extending from the catch to the first adjustment member 306. In some embodiments, each first slot 308 has a substantially oblong shape. In the illustrated embodiment, the first slots 308 are inclined to each other. Specifically, the pair of the first slots 308 are inclined to each other by an angle "A1". The angle "A1" may be greater than 0 degree and less than 180 degrees. Further, the first adjustment member 306 tapers from the catch.

The female buckle 352 includes a main body 354 and a second adjustment member 356. The female buckle 352 is removably coupled to the male buckle 302. The main body 354 is configured to at least partially receive the catch therein. The second adjustment member 356 defines a plurality of second slots 358 therethrough. Each second slot 358 is configured to movably receive the second webbing 110*b* (shown in FIGS. 1A-1B) therethrough. In some embodiments, the female buckle 352 may be a single integral part. In some embodiments, the male buckle 302 and the female buckle 352 may be made from metal, plastic, a composite material, or any combination thereof.

In the embodiment illustrated in FIGS. 3A-3B, the second adjustment member 356 further defines a second intermediate opening 359 extending therethrough and disposed at least partially between the pair of the second slots 358. The second intermediate opening 359 is tapered. Specifically, the second intermediate opening 359 is tapered in a direction extending from the main body 354 to the second adjustment member 356. In some embodiments, each second slot 358 has a substantially oblong shape. In the illustrated embodiment, the second slots 358 are inclined to each other. Specifically, the pair of the second slots 358 are inclined to each other by an angle "A2". The angle "A2" may be greater than 0 degree and less than 180 degrees. Further, the second adjustment member 356 tapers from the main body 354. In the illustrated embodiment, the second adjustment member 356 is a single integral part.

The buckle assembly 300 includes the pair of pawls 261 that are already described with reference to FIGS. 2A-2B. The pawls 261 are rotationally coupled to the main body 354 and are configured to removably receive the catch therebetween.

With continued reference to FIGS. 3A-3B, the main body 354 of the female buckle 352 further includes a first portion 366, a second portion 368 and the elongate member 270 defining the elongate axis "EA". The elongate member 270 is already described with reference to FIGS. 2A-2B. The first portion 366 defines a first end 362 proximal to the male buckle 302. The first portion 366 is configured to at least partially receive the catch therein, when the male buckle 302 is removably coupled to the female buckle 352. The second portion 368 defines a second end 364 distal to the male buckle 302. The second end 364 may be opposite to the first end 362. The second portion 368 is removably or fixedly coupled to the second adjustment member 356. In the illustrated embodiment, the second adjustment member 356 is fixedly coupled to the main body 354 by one or more second fasteners 382. In some embodiments, the second fasteners 382 may be rivets. In some other embodiments, the second fasteners 382 may be screws or bolts. The elongate member 270 is received through the second portion 368 and disposed between the first end 362 and the second end 364. The two opposing ends 272 of the elongate member 270 extend outwardly from the second portion 368.

Further, the second portion 368 of the main body 354 includes a cylindrical section 374 disposed between the first end 362 and the second end 364. The cylindrical section 374 is configured to receive the elongate member 270 therethrough. The cylindrical section 374 may have a hollow tubular shape for receiving the elongate member 270 therethrough. The buckle assembly 300 further includes the D-ring 271 rotatably coupled to the elongate member 270. The features and function of the D-ring 271 are already discussed above with reference to FIGS. 2A-2B.

As shown in FIG. 3B, the main body 354 includes a first part 376 and a second part 378. The first part 376 is connected to the second part 378 by one or more first fasteners 380. In some embodiments, the first fasteners 380 may be rivets. In some other embodiments, the first fasteners 380 may be screws or bolts. The pawls 261 are disposed at least partly between the first part 376 and the second part 378, such that the catch of the male buckle 302 is at least partly received and removably retained between the first and second parts 376, 378. The pawls 261 may be rotationally coupled to the first fasteners 380 proximal to the first end 366. In the illustrated embodiment, the first part 376 extends from the first end 362 to the second end 364. However, the second part 378 is shorter than the first part 376. The second part 378 may be disposed between the first end 362 and the cylindrical section 374. The first and second parts 376, 378 may therefore form the first portion 366, while the first part 376 may form the second portion 368 including the cylindrical section 374.

Referring to FIGS. 2A-3B, inclusion of the first adjustment member 206, 306 with the first slots 208, 308 and the second adjustment member 256, 356 with the second slots 258, 358 in the buckle assembly 200, 300, respectively, may provide the harness 100 with an X-shaped geometry or configuration. The X-shaped configuration of the harness 100 may improve comfort and sensation of security for a user. The X-shaped configuration of the harness 100 in the chest area may further improve comfort and safety for female users.

Furthermore, as shown in FIGS. 3A-3B, the first slots 308 are inclined to each other. Also, the second slots 358 are also inclined to each other. The angled first and second slots 308, 358 may enable adjustment of an angle of the X-shape of the harness 100 (shown in FIGS. 1A-1B) by a greater range as per the user's preferences.

Figure 4A:
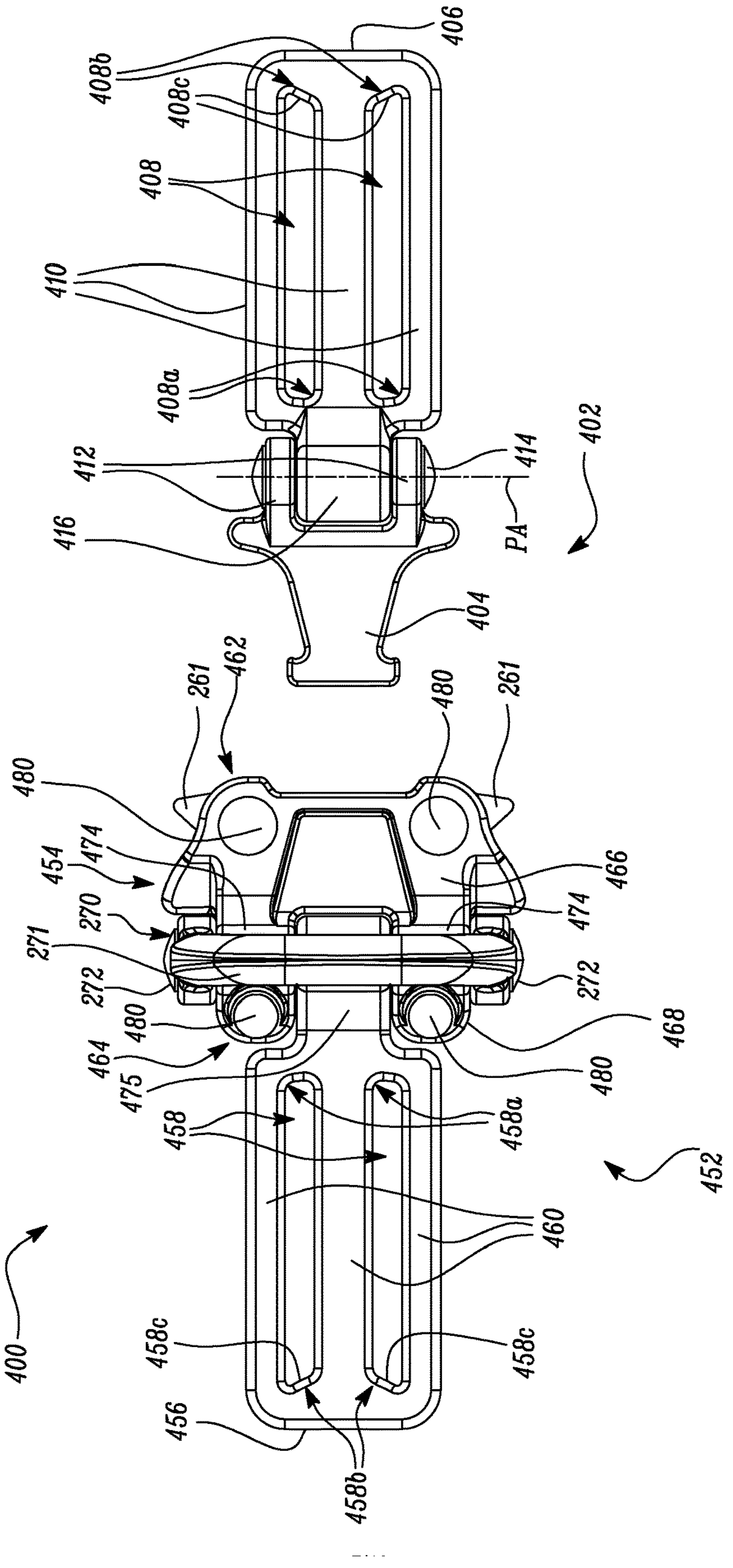
FIG. 4A is a top view of a buckle assembly of the harness of FIGS. 1A-1B, showing the male buckle and a female buckle disconnected from each other, in accordance with an embodiment of the present disclosure.
Figure 4B:
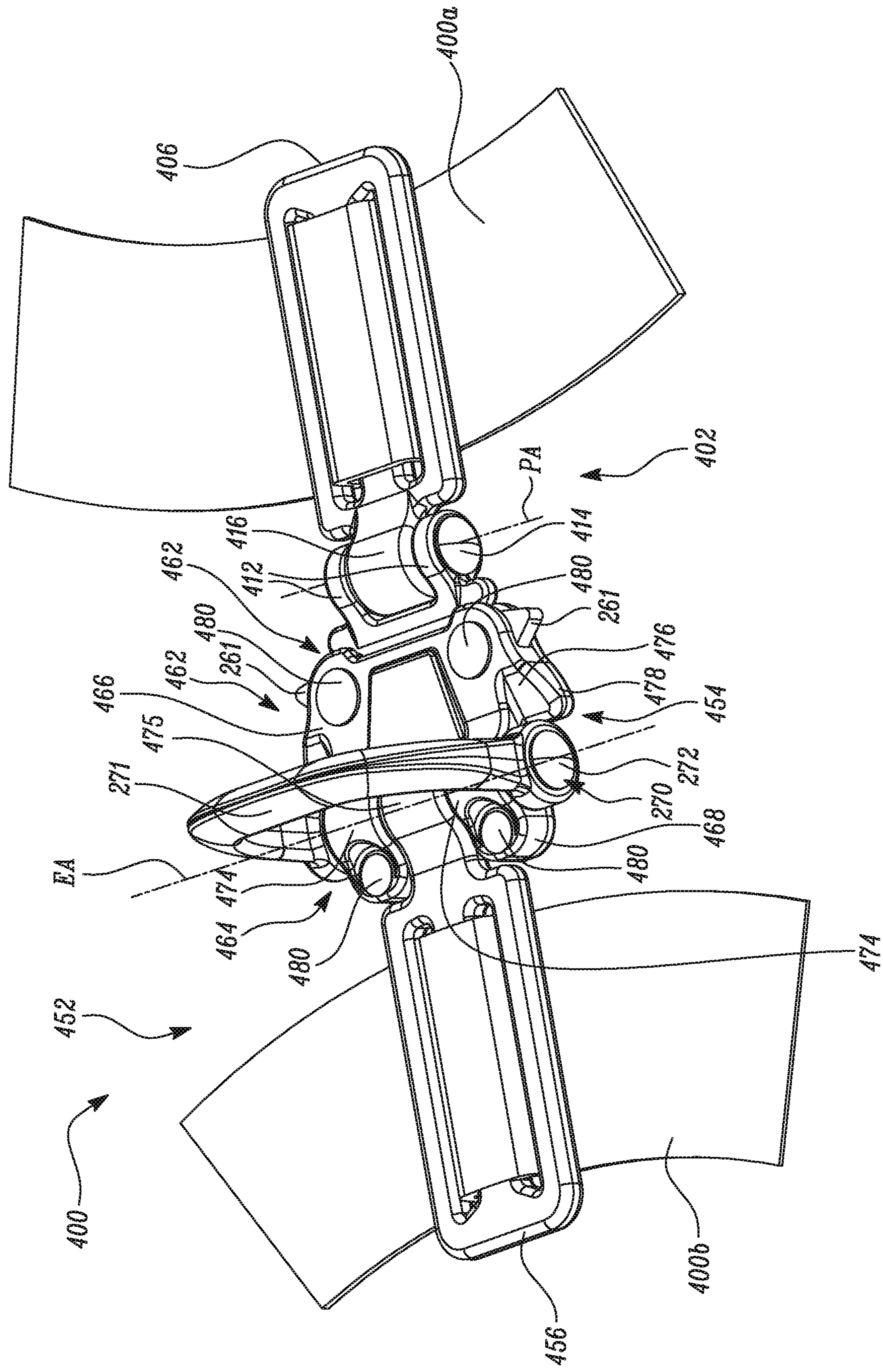
FIG. 4B is a front perspective view of the buckle assembly of FIG. 4A, showing the male buckle and the female buckle connected to each other.

FIGS. 4A-4B illustrate a buckle assembly 400 in accordance with an embodiment of the present disclosure. The buckle assembly 400 includes a male buckle 402 and a female buckle 452. The male buckle 402 includes a catch 404 and a first adjustment member 406 extending from the catch 404. The first adjustment member 406 defines a plurality of first slots 408 therethrough. As shown in FIG. 4B, each first slot 408 is configured to movably receive a first curved webbing 400*a* therethrough.

In the embodiment illustrated in FIGS. 4A-4B, the first adjustment member 406 further includes three first bars 410 joined to each other for defining a pair of the first slots 408. In some other embodiments, the first adjustment member 406 may include four (not shown) first bars 410 joined to each other for defining three (not shown) first slots 408. Each first slot 408 includes a rounded end 408*a* and an angled end 408*b* opposite to the rounded end 408*a*. The rounded end 408*a* is proximal to the catch 404 and the angled end 408*b* is distal to the catch 404. The angled end 408*b* further includes a straight portion 408*c* angling away from the catch 404. In the illustrated embodiment, the first slots 408 may be parallel to each other. Each first slot 408 may have an approximately oblong shape with the angled end 408*b*. Further, the first adjustment member 406 has a substantially uniform width along its length.

Furthermore, the catch 404 includes a pair of arms 412 and a pin 414. The arms 412 are spaced apart from each other and the pin 414 is received through the pair of arms 412. The first adjustment member 406 further includes a coupling portion 416. The coupling portion 416 is disposed at least partially between the pair of arms 412 and receives the pin 414 therethrough. Therefore, the first adjustment member 406 is rotatably coupled to the catch 404, such that the first adjustment member 406 is rotatable relative to the catch 404. Specifically, the first adjustment member 406 may be rotatable about a pin axis "PA" extending along a length of the pin 414. The coupling portion 416 and the pin 414 may form a pivot joint to allow rotation of the first adjustment member 406 relative to the catch 404.

The female buckle 452 includes a main body 454 and a second adjustment member 456. The female buckle 452 is removably coupled to the male buckle 402. The main body 454 is configured to at least partially receive the catch 404 therein. The second adjustment member 456 defines a plurality of second slots 458 therethrough. As shown in FIG. 4B, each second slot 458 is configured to movably receive a second curved webbing 400*b* therethrough. In some embodiments, the female buckle 452 may be a single integral part. In some embodiments, the male buckle 402 and the female buckle 452 may be made from metal, plastic, a composite material, or any combination thereof.

In the illustrated embodiment of FIGS. 4A-4B, the second adjustment member 456 further includes three second bars 460 joined to each other for defining a pair of the second slots 458. In some other embodiments, the second adjustment member 456 may include four (not shown) first bars 460 joined to each other for defining three (not shown) second slots 458. Each second slot 458 includes a rounded end 458*a* and an angled end 458*b* opposite to the rounded end 458*a*. The rounded end 458*a* is proximal to the main body 454 and the angled end 458*b* is distal to the main body 454. The angled end 458*b* further includes a straight portion 458*c* angling away from the main body 454. In the illustrated embodiment, the second slots 458 may be parallel to each other. Each second slot 458 may have an approximately oblong shape with the angled end 458*b*. Further, the second adjustment member 456 has a substantially uniform width along its length. In the illustrated embodiment, the second adjustment member 456 is a single integral part.

The buckle assembly 400 includes the pair of pawls 261 that are already described with reference to FIGS. 2A-2B. The pawls 261 are rotationally coupled to the main body 454 and are configured to removably receive the catch 404 therebetween.

With continued reference to FIGS. 4A-4B, the main body 454 of the female buckle 452 further includes a first portion 466, a second portion 468 and the elongate member 270 defining the elongate axis "EA". The elongate member 270 is already described with reference to FIGS. 2A-2B. The first portion 466 defines a first end 462 proximal to the male buckle 402. The first portion 466 is configured to at least partially receive the catch 404 therein, when the male buckle 402 is removably coupled to the female buckle 452. The second portion 468 defines a second end 464 distal to the male buckle 402. The second end 464 may be opposite to the first end 462. The second portion 468 is removably or fixedly coupled to the second adjustment member 456. The elongate member 270 is received through the second portion 468 and disposed between the first end 462 and the second end 464. The two opposing ends 272 of the elongate member 270 extend outwardly from the second portion 468.

Further, the second portion 468 includes a pair of cylindrical portions 474. The cylindrical portions 474 are spaced apart from each other and are configured to receive the elongate member 270 therethrough. Each cylindrical portion 474 may be hollow for receiving the elongate member 270 therethrough. The second adjustment member 456 further includes a connecting portion 475. The connecting portion 475 is disposed at least partially between the pair of cylindrical portions 474 and receives the elongate member 270 therethrough. Therefore, the second adjustment member 456 is rotatably coupled to the elongate member 270, such that the second adjustment member 456 is rotatable relative to the main body 454 and about the elongate axis "EA". The connecting portion 475 and the elongate member 270 may form a pivot joint to allow rotation of the second adjustment member 456 relative to the main body 454.

The buckle assembly 400 also includes the D-ring 271 rotatably coupled to the elongate member 270. The D-ring 271 is connected to the opposing ends 272 of the elongate member 270. The features and function of the D-ring 271 are already discussed with reference to FIGS. 2A-2B.

As shown in FIG. 4B, the main body 454 includes a first part 476 and a second part 478. The first part 476 is connected to the second part 478 by one or more fasteners 480. In some embodiments, the fasteners 480 may be rivets. In some other embodiments, the fasteners 480 may be screws or bolts. The pawls 261 are disposed at least partly between the first part 476 and the second part 478, such that the catch 404 of the male buckle 402 is at least partly received and removably retained between the first and second parts 476, 478. The pawls 261 may be rotationally coupled to the fasteners 480 proximal to the first end 462. In the illustrated embodiment, each of the first part 476 and the second part 478 extends from the first end 462 to the second end 464. The first and second parts 476, 478 may therefore together form the first portion 466 and the second portion 468 including the cylindrical portions 474.

Referring to FIGS. 1 and 4A-4B, each first slot 408 includes the angled end 408*b* and each second slot 458 includes the angled end 458*b* to facilitate use of first and second curved webbings 400*a*, 400*b*. The first and second slots 408, 458 may improve comfort and convenience of a user by receiving the first and second curved webbings 400*a*, 400*b*.

As the first adjustment member 406 is rotatable relative to the catch 404 about the pin axis "PA", and the second adjustment member 456 is rotatable relative to the main body 454 about the elongate axis "EA", a user may be able to configure and adjust the first and second curved webbings 400*a*, 400*b* on the user's torso as per the user's preferences.

Figure 5A:
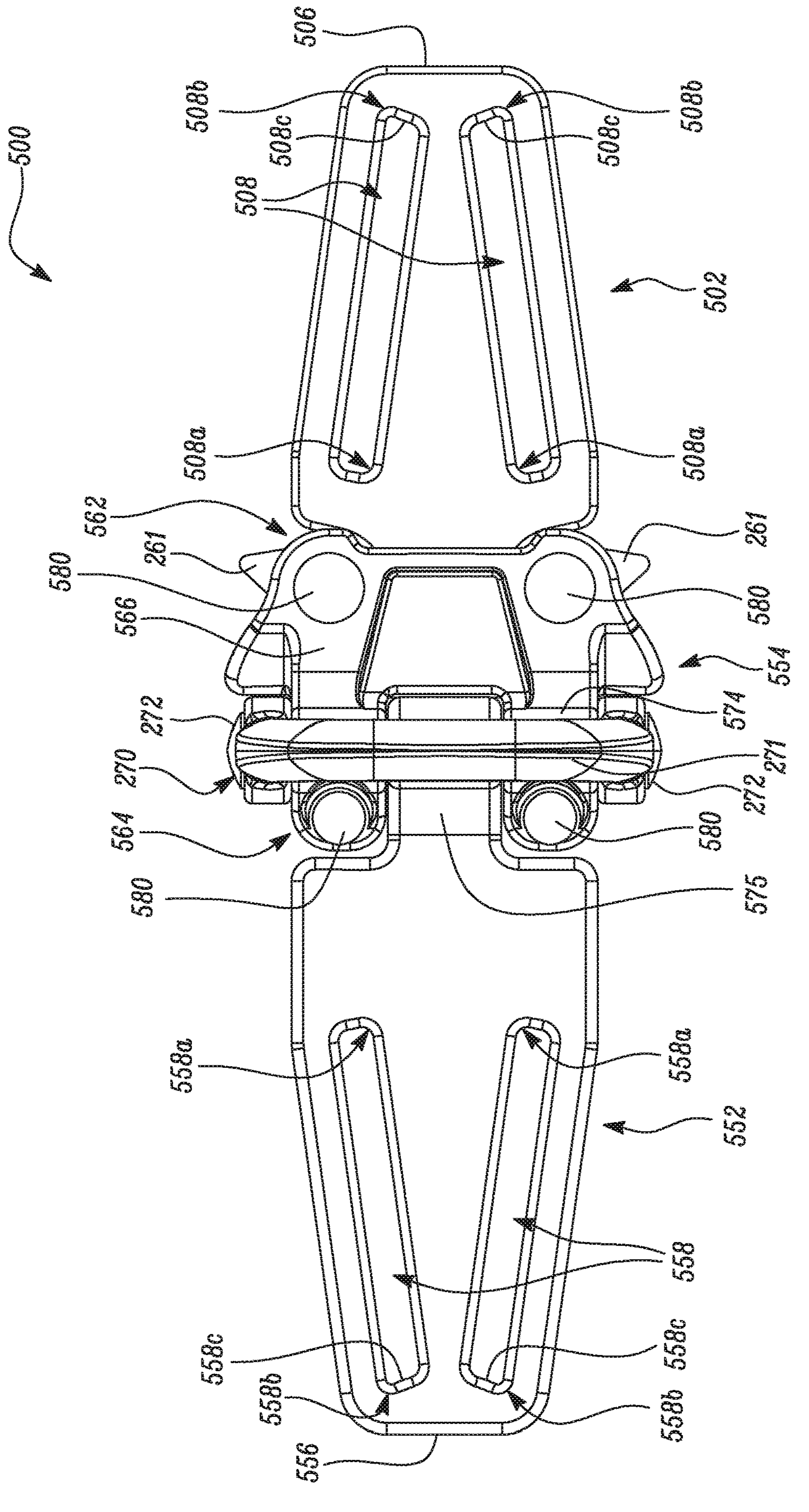
FIG. 5A is a top view of a buckle assembly of the harness of FIGS. 1A-1B, in accordance with an embodiment of the present disclosure.
Figure 5B:
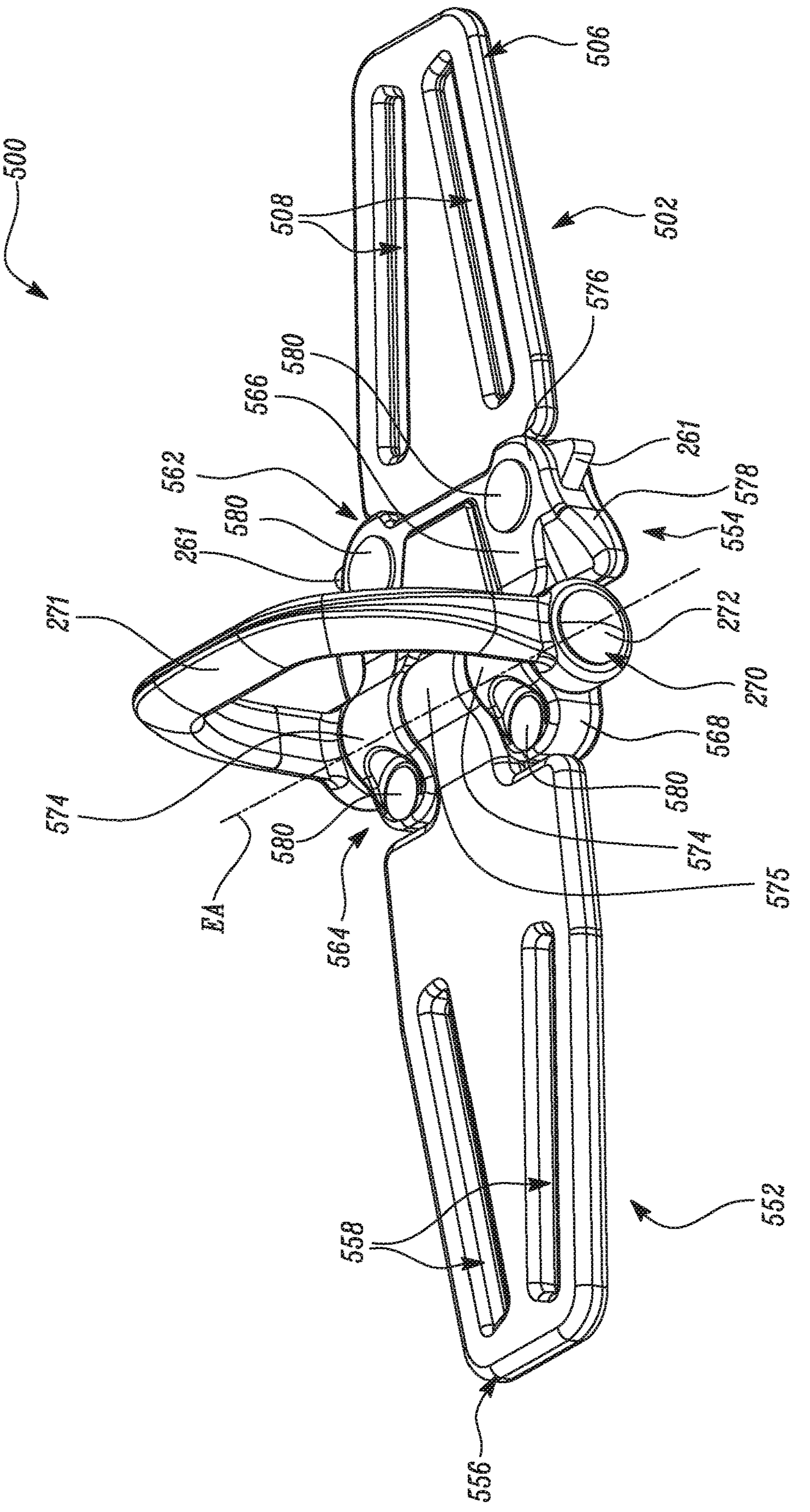
FIG. 5B is a front perspective view of the buckle assembly of FIG. 5B.

FIGS. 5A-5B illustrate a buckle assembly 500 in accordance with an embodiment of the present disclosure. The buckle assembly 500 includes a male buckle 502 and a female buckle 552. The male buckle 502 includes a catch (not shown) and a first adjustment member 506 extending from the catch. The catch may be substantially similar in geometry to the catch 204 shown in FIG. 2A. The first adjustment member 506 defines a plurality of first slots 508 therethrough. Each first slot 508 is configured to movably receive the first webbing 400*a* (shown in FIG. 4B) therethrough. In some embodiments, the male buckle 502 may be a single integral part.

In the embodiment illustrated in FIGS. 5A-5B, each first slot 508 includes a rounded end 508*a* and an angled end 508*b* opposite to the rounded end 508*a*. The rounded end 508*a* is proximal to the catch and the angled end 508*b* is distal to the catch. The angled end 508*b* further includes a straight portion 508*c* angling away from the catch. In the illustrated embodiment, the first slots 508 are inclined to each other. Further, the first adjustment member 506 tapers from the catch.

The female buckle 552 includes a main body 554 and a second adjustment member 556. The female buckle 552 is removably coupled to the male buckle 502. The main body 554 is configured to at least partially receive the catch therein. The second adjustment member 556 defines a plurality of second slots 558 therethrough. Each second slot 558 is configured to movably receive the second webbing 400*b* (shown in FIG. 4B) therethrough. In some embodiments, the female buckle 552 may be a single integral part. In some embodiments, the male buckle 502 and the female buckle 552 may be made from metal, plastic, a composite material, or any combination thereof.

In the illustrated embodiment of FIGS. 5A-5B, each second slot 558 includes a rounded end 558*a* and an angled end 558*b* opposite to the rounded end 558*a*. The rounded end 558*a* is proximal to the main body 554 and the angled end 558*b* is distal to the main body 554. The angled end 558*b* further includes a straight portion 558*c* angling away from the main body 554. In the illustrated embodiment, the second slots 558 are inclined to each other. Further, the second adjustment member 556 tapers from the main body 554. In the illustrated embodiment, the second adjustment member 556 is a single integral part.

The buckle assembly 500 includes the pair of pawls 261 that are already described with reference to FIGS. 2A-2B. The pawls 261 are rotationally coupled to the main body 554 and are configured to removably receive the catch therebetween.

As shown in FIG. 5B, the main body 554 includes a first part 576 and a second part 578. The first part 576 is connected to the second part 578 by one or more fasteners 580. In some embodiments, the fasteners 580 may be rivets. In some other embodiments, the fasteners 580 may be screws or bolts.

With continued reference to FIGS. 5A-5B, the main body 554 of the female buckle 552 further includes a first portion 566, a second portion 568 and the elongate member 270 defining the elongate axis "EA". The elongate member 270 is already described with reference to FIGS. 2A-2B. The first portion 566 defines a first end 562 proximal to the male buckle 502. The first portion 566 is configured to at least partially receive the catch therein, when the male buckle 502 is removably coupled to the female buckle 552. The second portion 568 defines a second end 564 distal to the male buckle 502. The second end 564 may be opposite to the first end 562. The second portion 568 is removably or fixedly coupled to the second adjustment member 556. The elongate member 270 is received through the second portion 568 and disposed between the first end 562 and the second end 564. The two opposing ends 272 of the elongate member 270 extend outwardly from the second portion 568.

Further, the second portion 568 includes a pair of cylindrical portions 574. The cylindrical portions 574 are spaced apart from each other and are configured to receive the elongate member 270 therethrough. The second adjustment member 556 further includes a connecting portion 575. The connecting portion 575 is disposed at least partially between the pair of cylindrical portions 574 and receives the elongate member 270 therethrough. Therefore, the second adjustment member 556 is rotatably coupled to the elongate member 270, such that the second adjustment member 556 is rotatable relative to the main body 554 and about the elongate axis "EA".

The buckle assembly 500 also includes the D-ring 271 rotatably coupled to the elongate member 270. The D-ring 271 is connected to the opposing ends 272 of the elongate member 270. The features and function of the D-ring 271 are already discussed with reference to FIGS. 2A-2B.

Figure 6A:
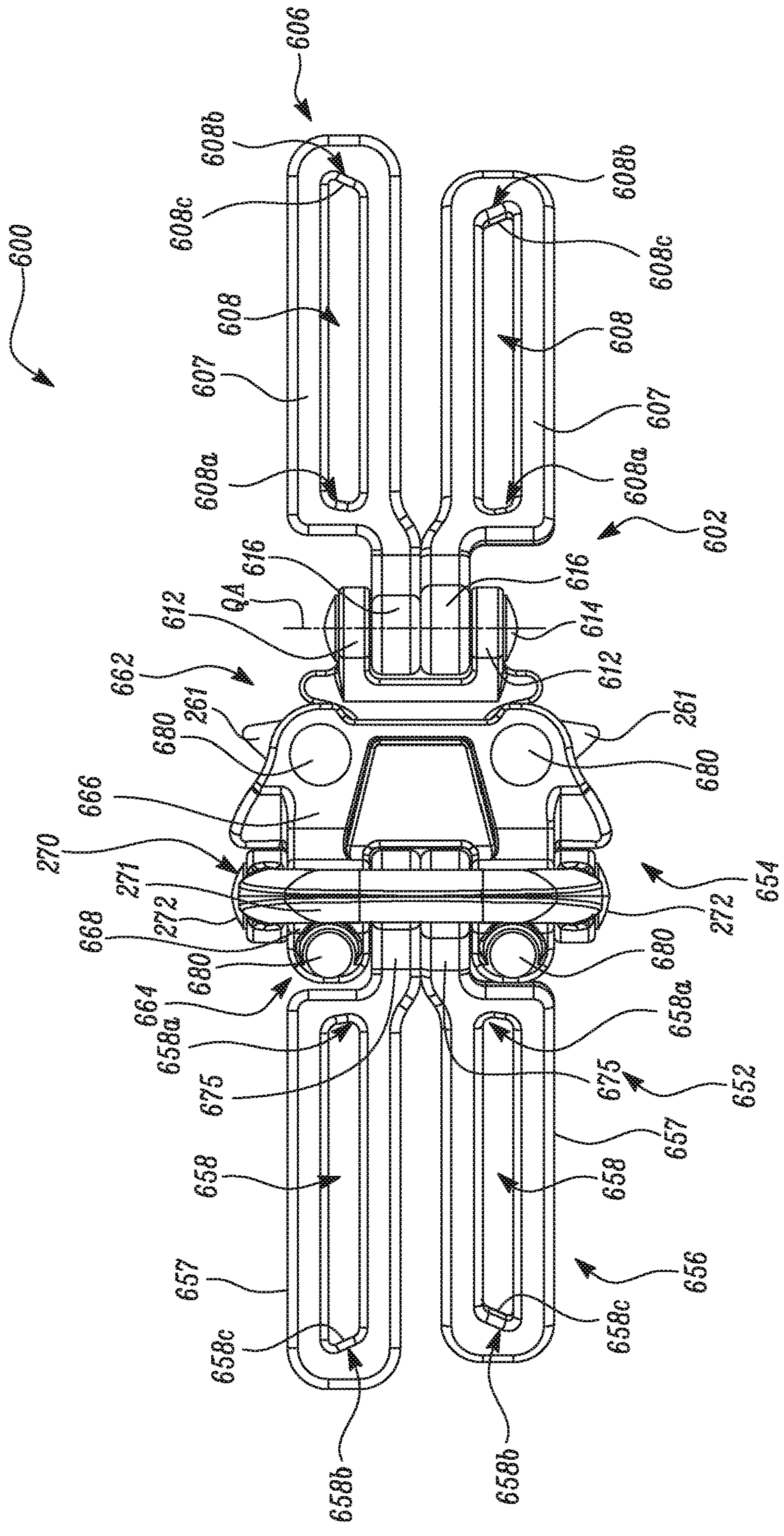
FIG. 6A is a top view of a buckle assembly of the harness of FIGS. 1A-1B, in accordance with an embodiment of the present disclosure.
Figure 6B:
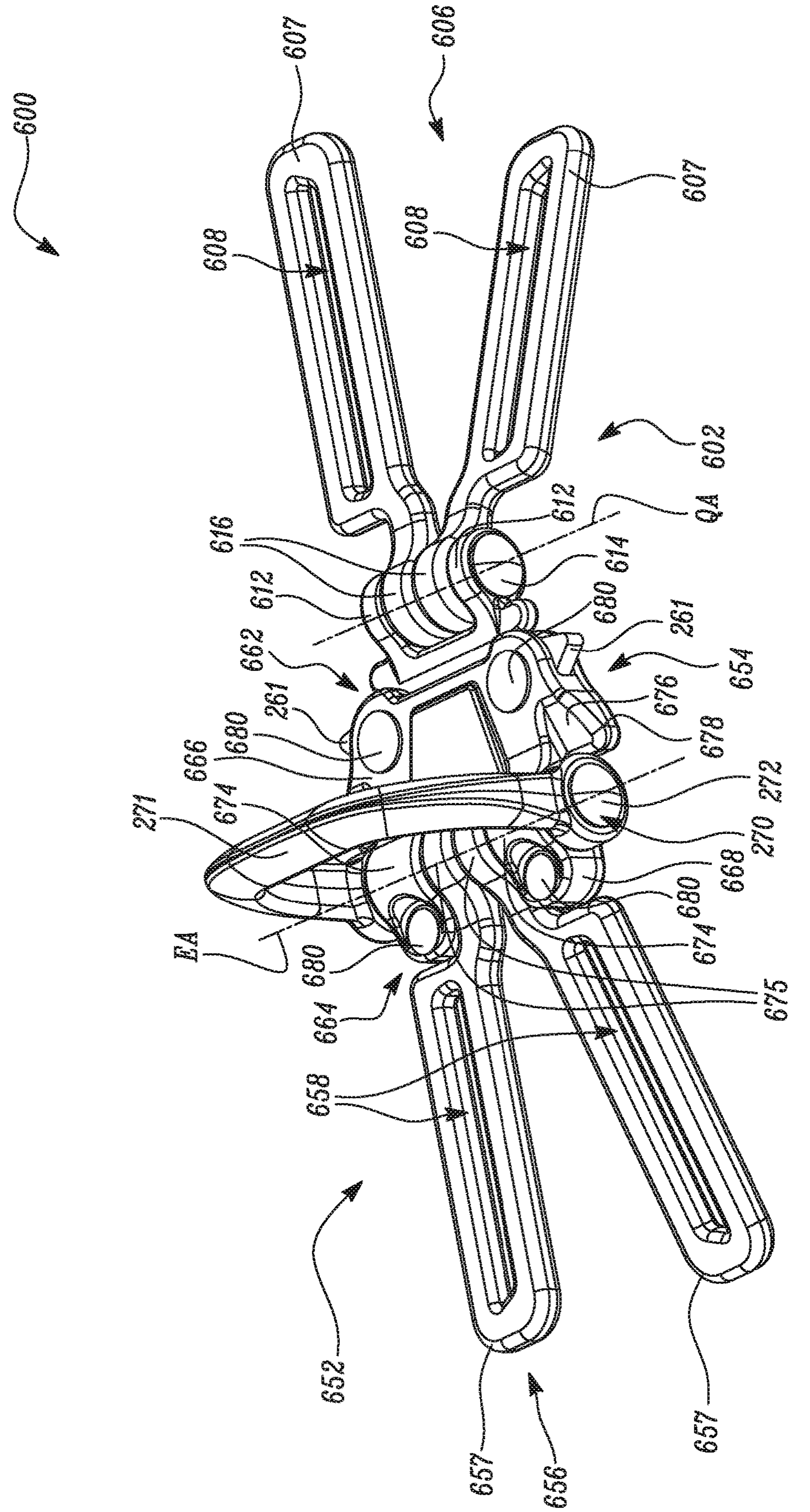
FIG. 6B is a front perspective view of the buckle assembly of FIG. 6B.

FIGS. 6A-6B illustrate a buckle assembly 600 in accordance with an embodiment of the present disclosure. The buckle assembly 600 includes a male buckle 602 and a female buckle 652. The male buckle 602 includes a catch (not shown) and a first adjustment member 606 extending from the catch. The catch may be substantially similar in geometry to the catch 404 shown in FIG. 4A. The first adjustment member 606 defines a plurality of first slots 608 therethrough. Each first slot 608 is configured to movably receive the first webbing 400*a* (shown in FIG. 4B) therethrough.

In the embodiment illustrated in FIGS. 6A-6B, the first adjustment member 606 includes a plurality of first adjustment portions 607 corresponding to the plurality of first slots 608. Each first adjustment portion 607 defines a corresponding first slot 608 from the plurality of first slots 608. In some embodiments, the first adjustment member 606 includes a pair of the first adjustment portions 607. In some other embodiments, the first adjustment member 606 may include three or more first adjustment portions 607.

Furthermore, the catch includes a pair of arms 612 and a pin 614. The pair of arms 612 are spaced apart from each other and the pin 614 is received through the pair of arms 612. Each first adjustment portion 607 includes a coupling portion 616. The coupling portion 616 is disposed at least partially between the pair of arms 612 and receives the pin 614 therethrough. Therefore, each first adjustment portion 607 is rotatably connected to the catch, such that the first adjustment portions 607 are rotatable independently from each other relative to the catch. Specifically, the coupling portion 616 of each first adjustment portion 607 and the pin 614 may form a pivot joint, such that each first adjustment portion 607 is rotatable about a pin axis "QA" defined by the pin 614 along its length. Further, the first adjustment portions 607 are rotatable independently of each other, such that the first adjustment portions 607 can be rotated or adjusted to different positions relative to the catch.

In the illustrated embodiment of FIGS. 6A-6B, each first slot 608 includes a rounded end 608*a* and an angled end 608*b* opposite to the rounded end 608*a*. The rounded end 608*a* is proximal to the catch and the angled end 608*b* is distal to the catch. The angled end 608*b* further includes a straight portion 608*c* angling away from the catch. In the illustrated embodiment, each first slot 608 is substantially parallel to a longitudinal axis of the respective first adjustment portion 607. The first slots 608 may therefore be substantially parallel to each other when the first adjustment portions 607 are positioned substantially parallel to each other. However, in some other embodiments, each first slot 608 may be inclined relative to the longitudinal axis of the respective first adjustment portion 607. Further, the adjustment portions 607 may be arranged such that the first slots 608 are inclined to each other for all positions of the first adjustment portions 607.

The female buckle 652 includes a main body 654 and a second adjustment member 656. The female buckle 652 is removably coupled to the male buckle 602. The main body 654 is configured to at least partially receive the catch therein. The second adjustment member 656 defines a plurality of second slots 658 therethrough. Each second slot 658 is configured to movably receive the second webbing 400*b* (shown in FIG. 4B) therethrough. In some embodiments, the male buckle 602 and the female buckle 652 may be made from metal, plastic, a composite material, or any combination thereof.

The buckle assembly 600 further includes the pair of pawls 261 that are already described with reference to FIGS. 2A-2B. The pawls 261 are rotationally coupled to the main body 654 and are configured to removably receive the catch therebetween.

As shown in FIG. 6B, the main body 654 includes a first part 676 and a second part 678. The first part 676 is connected to the second part 678 by one or more fasteners 680. In some embodiments, the fasteners 680 may be rivets. In some other embodiments, the fasteners 680 may be screws or bolts.

With continued reference to FIGS. 6A-6B, the main body 654 of the female buckle 652 includes a first portion 666, a second portion 668 and the elongate member 270 defining the elongate axis "EA". The elongate member 270 is already described with reference to FIGS. 2A-2B. The first portion 666 defines a first end 662 proximal to the male buckle 602. The first portion 666 is configured to at least partially receive the catch therein, when the male buckle 602 is removably coupled to the female buckle 652. The second portion 668 defines a second end 664 distal to the male buckle 602. The second end 664 may be opposite to the first end 662. The second portion 668 is removably or fixedly coupled to the second adjustment member 656. The elongate member 270 is received through the second portion 668 and disposed between the first end 662 and the second end 664. The two opposing ends 272 of the elongate member 270 extend outwardly from the second portion 668.

In the embodiment illustrated in FIGS. 6A-6B, the second adjustment member 656 includes a plurality of second adjustment portions 657 corresponding to the plurality of second slots 658. Each second adjustment portion 657 defines a corresponding second slot 658 from the plurality of second slots 658. In some embodiments, the second adjustment member 656 includes a pair of the second adjustment portions 657. In some other embodiments, the second adjustment member 656 may include three or more second adjustment portions 657.

In the illustrated embodiment of FIGS. 6A-6B, each second slot 658 includes a rounded end 658*a* and an angled end 658*b* opposite to the rounded end 658*a*. The rounded end 658*a* is proximal to the main body 654 and the angled end 658*b* is distal to the main body 654. The angled end 658*b* further includes a straight portion 658*c* angling away from the main body 654. In the illustrated embodiment, each second slot 658 is substantially parallel to a longitudinal axis of the respective second adjustment portion 657. The second slots 658 may therefore be substantially parallel to each other when the second adjustment portions 657 are positioned substantially parallel to each other. However, in some other embodiments, each second slot 658 may be inclined relative to the longitudinal axis of the respective second adjustment portion 657. Further, the adjustment portions 657 may be arranged such that the second slots 658 are inclined to each other for all positions of the second adjustment portions 657.

Further, the second portion 668 includes a pair of cylindrical portions 674. The cylindrical portions 674 are spaced apart from each other and are configured to receive the elongate member 270 therethrough. Each second adjustment portion 657 includes a connecting portion 675. The connecting portion 675 is disposed at least partially between the pair of cylindrical portions 674 and receives the elongate member 270 therethrough. Therefore, each second adjustment portion 657 is rotatably coupled to the elongate member 270, such that the second adjustment portions 657 are rotatable independently from each other relative to the main body 654 and about the elongate axis "EA". Specifically, the connecting portion 675 of each second adjustment portion 657 and the elongate member 270 may form a pivot joint, such that each second adjustment portion 657 is rotatable about the elongate axis "EA". Further, the second adjustment portions 657 are rotatable independently of each other, such that the second adjustment portions 657 can be rotated or adjusted to different positions relative to the catch.

The buckle assembly 600 also includes the D-ring 271 rotatably coupled to the elongate member 270. The D-ring 271 is connected to the opposing ends 272 of the elongate member 270. The features and function of the D-ring 271 are already discussed with reference to FIGS. 2A-2B.

The first adjustment portions 607 are rotatable independently from each other relative to the catch and about the pin axis "QA", and the second adjustment portions 657 are rotatable relative to the main body 654 and about the elongate axis "EA". Therefore, the buckle assembly 600 may allow multiple inclination angles for the first and second adjustment members 606, 656 of the male and female buckles 602, 652, respectively. Specifically, the first adjustment portions 607 and the second adjustment portions 657 can be adjusted to different inclination angles relative to each other. The possibility of multiple inclination angles in the buckle assembly 600 of the harness 100 may allow a user to adjust the first and second curved webbings 400*a*, 400*b* (shown in FIG. 4B) as per body features and shapes.

In the illustrated embodiment, the first adjustment portions 607 are substantially identical to each other, and the second adjustment portions 657 are substantially identical to each other. However, in some other embodiments, at least two first adjustment portions 607 may have different shapes and/or dimensions, and at least two second adjustment portions 657 may have different shapes and/or dimensions.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising a main body configured to at least partially receive the catch therein and a second adjustment member coupled to the main body, the second adjustment member defining a plurality of second slots therethrough, wherein each second slot is configured to movably receive a second webbing therethrough, wherein the female buckle further comprises a pair of pawls rotationally coupled to the main body and configured to removably receive the catch therebetween.

2. The buckle assembly of claim 1, wherein the first adjustment member comprises three first bars joined to each other for defining a pair of the first slots.

3. The buckle assembly of claim 2, wherein the first adjustment member further defines a first intermediate opening extending therethrough and disposed at least partially between the pair of the first slots, and wherein the first intermediate opening is tapered.

4. The buckle assembly of claim 2, wherein the pair of first slots are inclined to each other.

5. The buckle assembly of claim 1, wherein the first adjustment member is rotatably coupled to the catch, such that the first adjustment member is rotatable relative to the catch.

6. A wearable body harness comprising:

a first webbing;

a second webbing; and the buckle assembly of claim 1.

7. The buckle assembly of claim 1, wherein the male buckle is a single integral part.

8. The buckle assembly of claim 1, wherein the first slots are substantially parallel to each other.

9. The buckle assembly of claim 1, wherein each first slot has a substantially oblong shape.

10. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising:

a main body comprising a first portion defining a first end proximal to the male buckle and a second portion defining a second end distal to the male buckle, wherein the first portion is configured to at least partially receive the catch therein;

an elongate member received through the second portion and disposed between the first end and the second end, the elongate member defining an elongate axis along its length; and a second adjustment member defining a plurality of second slots therethrough, wherein each second slot is configured to movably receive a second webbing therethrough, and wherein the second adjustment member is rotatably coupled to the elongate member, such that the second adjustment member is rotatable relative to the main body and about the elongate axis.

11. The buckle assembly of claim 10, wherein the first adjustment member is rotatably coupled to the catch, such that the first adjustment member is rotatable relative to the catch.

12. The buckle assembly of claim 10, wherein the first adjustment member comprises a plurality of first adjustment portions corresponding to the plurality of first slots, such that each first adjustment portion defines a corresponding first slot from the plurality of first slots, and wherein each first adjustment portion is rotatably connected to the catch, such that the first adjustment portions are rotatable independently from each other relative to the catch.

13. The buckle assembly of claim 10, wherein the second adjustment member comprises a plurality of second adjustment portions corresponding to the plurality of second slots, such that each second adjustment portion defines a corresponding second slot from the plurality of second slots, and wherein each second adjustment portion is rotatably coupled to the elongate member, such that the second adjustment portions are rotatable independently from each other relative to the main body and about the elongate axis.

14. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising a main body configured to at least partially receive the catch therein and a second adjustment member coupled to the main body, the second adjustment member defining a plurality of second slots therethrough, wherein each second slot is configured to movably receive a second webbing therethrough, wherein the main body of the female buckle further comprises a first portion defining a first end proximal to the male buckle, a second portion defining a second end distal to the male buckle, and an elongate member received through the second portion and disposed between the first end and the second end, wherein the first portion at least partially receives the catch therein, wherein the second portion is coupled to the second adjustment member, and wherein the elongate member defines an elongate axis along its length.

15. The buckle assembly of claim 14, wherein the second portion comprises a cylindrical section disposed between the first end and second end, the cylindrical section receiving the elongate member therethrough.

16. The buckle assembly of claim 14, further comprising a D-ring rotatably coupled to the elongate member, such that the D-ring is rotatable relative to the main body and about the elongate axis.

17. The buckle assembly of claim 16, wherein opposing ends of the elongate member extend outwardly from the second portion, and wherein the D-ring is connected to the opposing ends of the elongate member.

18. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising a main body configured to at least partially receive the catch therein and a second adjustment member coupled to the main body, the second adjustment member defining a plurality of second slots therethrough, wherein each second slot is configured to movably receive a second webbing therethrough, wherein the buckle assembly further comprises one or more fasteners for fixedly coupling the second adjustment member to the main body.

19. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising a main body configured to at least partially receive the catch therein and a second adjustment member coupled to the main body, the second adjustment member defining a plurality of second slots therethrough, wherein each second slot is configured to movably receive a second webbing therethrough, wherein the first adjustment member comprises a plurality of first adjustment portions corresponding to the plurality of first slots, such that each first adjustment portion defines a corresponding first slot from the plurality of first slots, and wherein each first adjustment portion is rotatably connected to the catch, such that the first adjustment portions are rotatable independently from each other relative to the catch.

20. A buckle assembly comprising:

a male buckle comprising a catch and a first adjustment member extending from the catch, the first adjustment member defining a plurality of first slots therethrough, wherein each first slot is configured to movably receive a first webbing therethrough; and a female buckle removably coupled to the male buckle, the female buckle comprising a main body configured to at least partially receive the catch therein and a second adjustment member coupled to the main body, the second adjustment member defining a plurality of second slots therethrough, wherein each second slot is configured to movably receive a second webbing therethrough, wherein each first slot comprises a rounded end proximal to the catch and an opposing angled end distal to the catch, wherein the angled end comprises a straight portion angling away from the catch.

21. The buckle assembly of claim 20, wherein each second slot comprises a rounded end proximal to the main body and an opposing angled end distal to the main body, wherein the angled end comprises a straight portion angling away from the main body.

* * * * *